United States Patent
Reese, II

(10) Patent No.: US 12,157,473 B2
(45) Date of Patent: Dec. 3, 2024

(54) TURBULENT JET IGNITION COLD START AID VIA COMPRESSION HEATING

(71) Applicant: FCA US LLC, Auburn Hills, MI (US)

(72) Inventor: Ronald A Reese, II, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 219 days.

(21) Appl. No.: 17/979,898

(22) Filed: Nov. 3, 2022

(65) Prior Publication Data

US 2024/0149880 A1 May 9, 2024

(51) Int. Cl.
| | |
|---|---|
| *B60W 10/08* | (2006.01) |
| *B60W 10/06* | (2006.01) |
| *B60W 30/192* | (2012.01) |
| *F02N 19/02* | (2010.01) |

(52) U.S. Cl.
CPC .......... *B60W 30/192* (2013.01); *B60W 10/06* (2013.01); *B60W 10/08* (2013.01); *F02N 19/02* (2013.01)

(58) Field of Classification Search
CPC .... B60W 30/192; B60W 10/06; B60W 10/08; F02N 19/02
See application file for complete search history.

(56) References Cited

U.S. PATENT DOCUMENTS

| | | |
|---|---|---|
| 10,612,454 B2 | 4/2020 | Bedogni et al. |
| 11,255,240 B1 | 2/2022 | Glugla et al. |
| 11,352,968 B1 | 6/2022 | Kiwan et al. |

*Primary Examiner* — Mathew Franklin Gordon
(74) *Attorney, Agent, or Firm* — Jeremy J. Klobucar

(57) ABSTRACT

Electrified powertrain control techniques include, in response to a detected cold start request for an engine, controlling one or more electric motors to generate drive torque to physically power an engine for a period to increase a temperature within a primary combustion chamber of a cylinder of the engine, and after the period, starting the engine by combusting a primary charge of fuel/air within the primary combustion chamber using a turbulent jet ignition (TJI) system to combust a pre-charge of fuel/air in a respective pre-chamber of the cylinder using a respective first spark plug and expelling heat energy therefrom into the primary combustion chamber of the cylinder, thereby eliminating a need for a respective second park plug of the TJI system that is associated with the cylinder and configured to heat and promote combustion within the primary combustion chamber.

14 Claims, 3 Drawing Sheets

TURBULENT JET IGNITION COLD START AID VIA COMPRESSION HEATING

FIELD

The present application generally relates to turbulent jet ignition (TJI) ignition enhancement technology for spark ignition engines and, more particularly, to TJI engine cold start aid via compression heating.

BACKGROUND

Referring now to FIG. 1, an engine block 1 defines a plurality of cylinders 2. A cylinder head 3 is mounted on the engine block 1, in which, at each cylinder 2, a primary combustion chamber 4 is formed between an intake duct/valve (not shown) and an exhaust duct/valve (not shown). Within each cylinder 2, a piston 9 is movable, connected by a piston rod 10 to an engine crankshaft (not shown). For each cylinder 2, a first spark plug 11 having electrodes 11A is provided, mounted within a support element 12 defining a combustion pre-chamber 13 inside. This pre-chamber 13 is provided for combustion of a pre-charge of fuel (e.g., gasoline) from a fuel source (e.g., a fuel injector, not shown) and air, including a small fraction (e.g., ~3%) of the total fuel energy. High-pressure jet streams of hot gasses resulting from the combustion of the pre-charge is forced through a plurality of small orifices 14 in the pre-chamber 13 and into the primary combustion chamber 4 of the cylinder 2.

These hot gasses cause ignition of a primary charge of fuel/air from a fuel source (e.g., another fuel injector, not shown) within the primary combustion chamber 4, typically without using a spark from additional spark plug 15. For example, these orifices 14 could be designed to optimize the spray of the hot gasses to achieve a more even burn within the primary combustion chamber 4. The primary fuel/air charge is able to be much leaner than stoichiometric, which results in improved engine efficiency. Additionally or alternatively, lambda one (and extended lambda one) operation via faster apparent burn rate is another benefit. One problem in TJI technology, however, is the primary fuel/air charge may not be ignitable at certain operating conditions, such as engine cold starts and light load conditions. That is, the flame does not occur or propagate in the pre-chamber (e.g., too diluted, light-load, or engine start), or the hot gases leaving the orifices 14 could lose too much heat and thus cannot ignite the main charge (e.g., a cold charge).

One solution to this problem is the addition of the additional conventional spark plug 15 having electrodes 15A that aim to reduce and modulate the combustion rate and to allow stable engine operation at low temperatures and low loads. This additional spark plug 15, however, increases costs and packaging size, thus limiting the use of TJI technology to specifically-designed applications. Accordingly, while such conventional TJI systems do work well for their intended purpose, there exists an opportunity for improvement in the relevant art.

SUMMARY

According to one example aspect of the invention, an electrified powertrain of an electrified vehicle is presented. In one exemplary implementation, the electrified powertrain comprises an internal combustion engine configured to combust fuel/air within respective primary combustion chambers of a plurality of cylinders to generate drive torque, and including a turbulent jet ignition (TJI) system configured to combust a pre-charge of fuel/air in a pre-chamber of a particular cylinder using a respective first spark plug and expel heat energy therefrom into a respective primary combustion chamber of the particular cylinder, one or more electric motors connected in series with the engine and configured to generate drive torque, and a controller configured to detect a request to cold start the engine and, in response to the detected cold start request: control the one or more electric motors to generate drive torque to physically power the engine for a period to increase a temperature within the particular primary combustion chamber, and after the period, starting the engine by combusting a primary charge of fuel/air within the respective primary combustion chamber using the TJI system, wherein controlling the one or more electric motors to physically power the engine for the period eliminates a need fora respective second park plug of the TJI system that is associated with the particular cylinder and configured to heat and promote combustion within the particular primary combustion chamber.

In some implementations, the elimination of the respective second spark plug decreases at least one of cost and packaging of the engine. In some implementations, the controller is further configured to detect a light load request and, in response to detecting the light load request, temporarily disabling or shutting off the engine and controlling the one or more electric motors to generate drive torque satisfying the light load request. In some implementations, the engine is further configured to recycle or re-use heat energy generated by controlling the one or more electric motors to generate drive torque to physically power the engine for the period.

In some implementations, the engine further comprises an exhaust gas recirculation (EGR) system configured to recycle exhaust gas resulting from combustion of the primary fuel/air charge back into the engine. In some implementations, the engine further comprises a valve control system configured to control an overlap of closing intake and exhaust valves of the particular cylinder to recycle exhaust gas resulting from combustion of the primary fuel/air charge within the particular cylinder. In some implementations, the TJI system is capable of being incorporated to any engine without a re-design.

According to another example aspect of the invention, a method of controlling an electrified powertrain of an electrified vehicle, the electrified powertrain comprising an internal combustion engine comprising a TJI system and being connected in series with one or more electric motors, is presented. In one exemplary implementation, the method comprises detecting, by a controller of the electrified powertrain, a request to cold start the engine and, in response to the detected cold start request, controlling, by the controller, the one or more electric motors to generate drive torque to physically power the engine for a period to increase a temperature within a primary combustion chamber of a cylinder of the engine, and after the period, starting, by the controller, the engine by combusting a primary charge of fuel/air within the primary combustion chamber using the TJI system to combust a pre-charge of fuel/air in a respective pre-chamber of the cylinder using a respective first spark plug and expelling heat energy therefrom into the primary combustion chamber of the cylinder, wherein controlling the one or more electric motors to physically power the engine for the period eliminates a need for a respective second park plug of the TJI system that is associated with the cylinder and configured to heat and promote combustion within the primary combustion chamber.

In some implementations, the elimination of the respective second spark plug decreases at least one of cost and packaging of the engine. In some implementations, the method further comprises detecting, by the controller, a light load request and, in response to detecting the light load request, temporarily disabling or shutting off, by the controller, the engine and controlling the one or more electric motors to generate drive torque satisfying the light load request. In some implementations, the engine is further configured to recycle or re-use heat energy generated by controlling the one or more electric motors to generate drive torque to physically power the engine for the period.

In some implementations, the engine further comprises an EGR system configured to recycle exhaust gas resulting from combustion of the primary fuel/air charge back into the engine. In some implementations, the engine further comprises a valve control system configured to control an overlap of closing intake and exhaust valves of the particular cylinder to recycle exhaust gas resulting from combustion of the primary fuel/air charge within the particular cylinder. In some implementations, the TJI system is capable of being incorporated to any engine without a re-design.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, the addition of another conventional spark plug that aims to reduce combustion/burn time and to allow stable turbulent jet ignition (TJI) equipped engine operation at low temperatures and low loads. This additional spark plug, however, increases costs and packaging size, thus limiting the use of TJI technology to specifically-designed applications. Accordingly, there exists and opportunity for improvement in the relevant art. As a result, the present application is directed to techniques that leverage the torque generation capability of electric motor(s) in a series hybrid electrified powertrain configuration to "preheat" (increase a temperature within) primary combustion chambers of cylinders (e.g., heating up the nozzle orifices) of the engine by temporarily physically powering the engine using the electric motor(s) in response to a cold start request. This eliminates the need for the above-described second spark plug for each cylinder of the engine to heat and promote combustion within the primary combustion chambers. The potential benefits are decreased costs and/or packaging, as well as the ability to implement TJI technology on any existing engine without a substantial re-design.

Figure 2A:
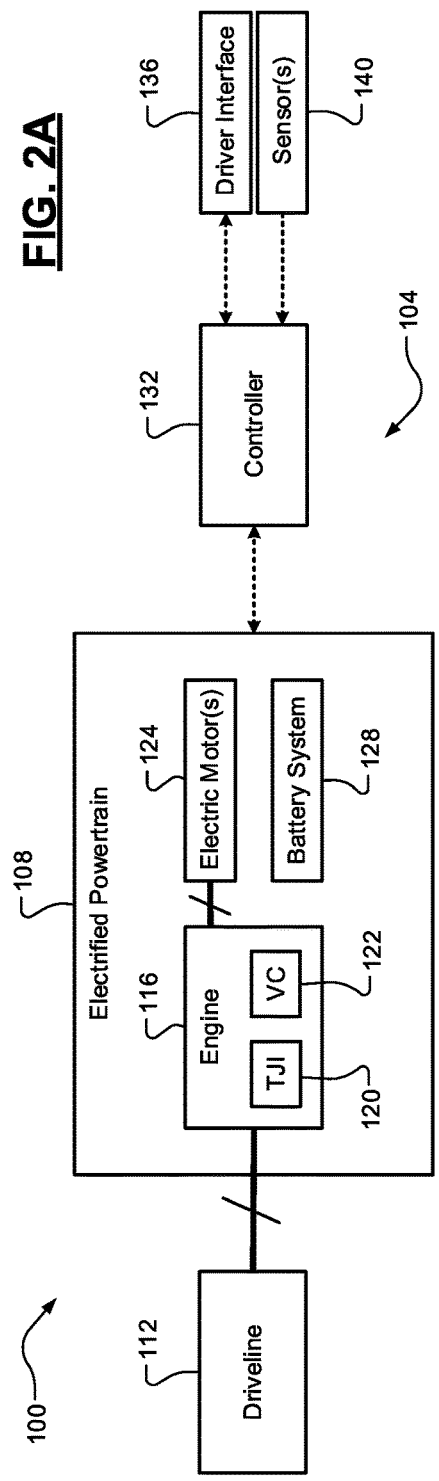
FIGS. 2A-2B are a functional block diagram of an electrified powertrain having an engine with a TJI system and a side or cross-sectional view of a portion of the engine according to the principles of the present application.
Figure 2B:
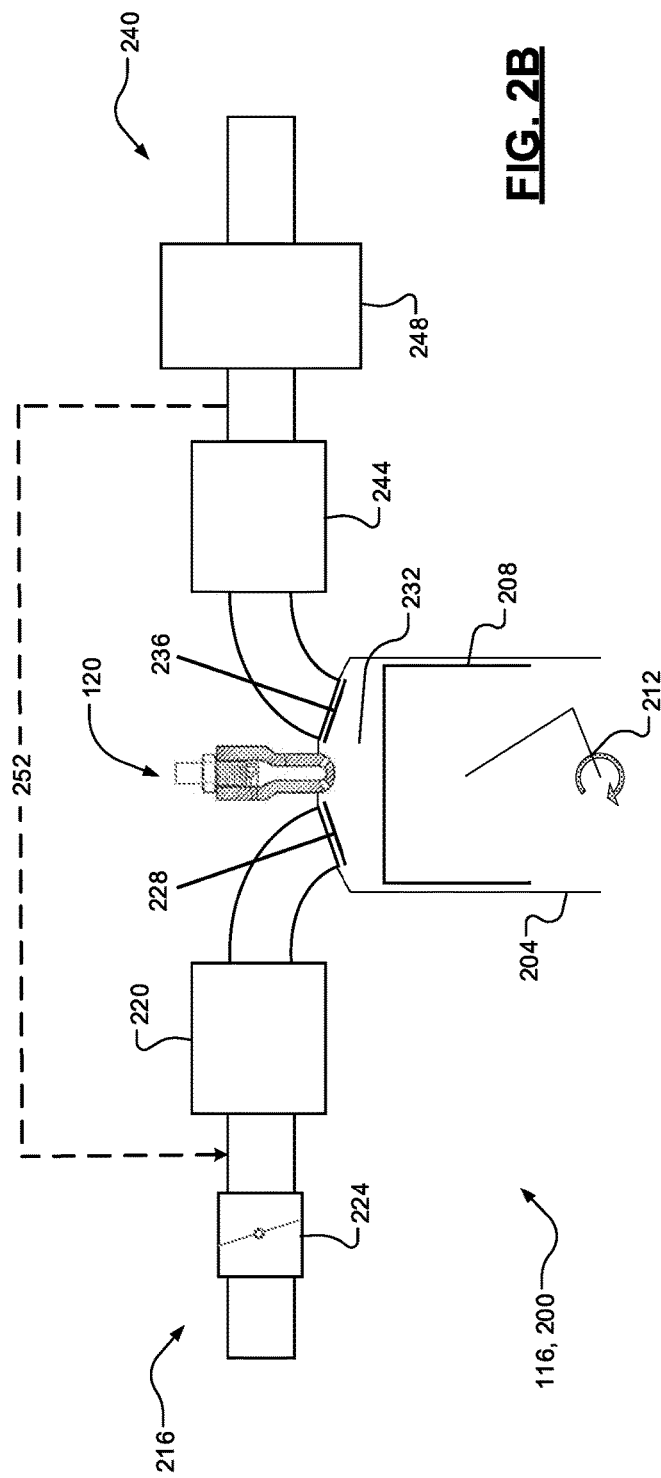

Referring now to FIGS. 2A-2B, a functional block diagram of a vehicle 100 (e.g., an electrified vehicle) including an electrified powertrain 108 having an engine 116 with a TJI system 120 and a side or cross-sectional view 200 of a portion of the engine 116 according to the principles of the present application are illustrated. The engine 116 is configured to combust a mixture of fuel (e.g., gasoline) and air within a plurality of cylinders 224 to generate drive torque that is selectively transferred to a driveline 112 (e.g., via a transmission, not shown). For a series hybrid, the engine 116 sends torque to a generator, which in turn sends electricity (e.g., current) to the electrified driveline.

The electrified powertrain 108 further comprises one or more electric motors 124 powered by a battery system 128 and selectively connected (e.g., via a clutch or fluid coupling) in series to a crankshaft 212 of the engine 116. This configuration of the electrified powertrain 108 is also referred to as a "series configuration" in contrast to other configurations such as a "parallel configuration." In other words, the engine 116 and the electric motor(s) 124 are connectable in-line with each other such that one or both are driven and can drive the other.

Figure 1:
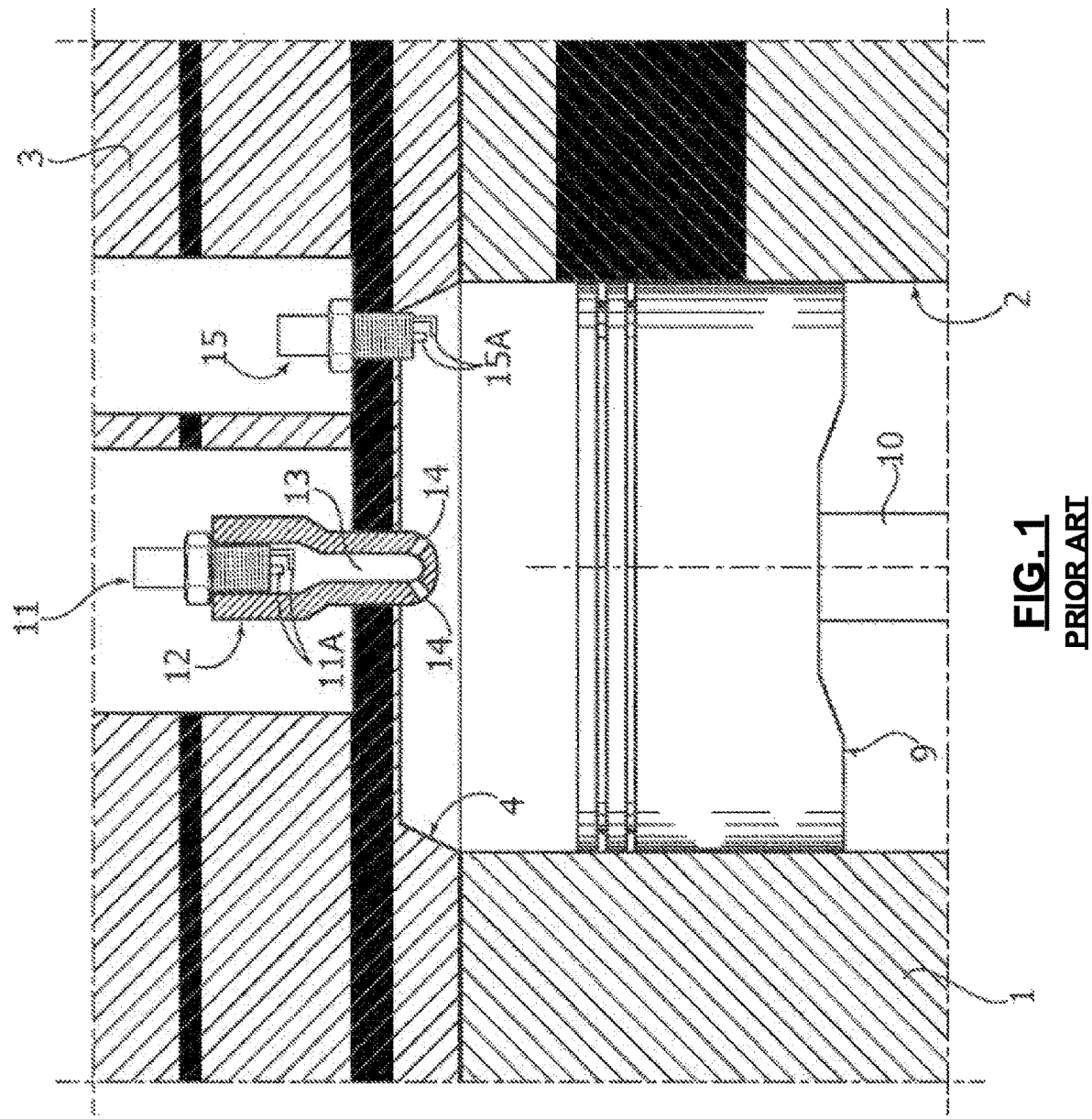
FIG. 1 is a side cross-sectional view of a conventional turbulent jet ignition (TJI) system of an engine having a secondary spark plug according to the prior art.

The operation of the engine 116 will now be described in greater detail. The engine 116 draws in fresh air into an intake manifold 220 through an induction system 216 that is regulated by a throttle valve 224. The air in the intake manifold 220 is distributed to the plurality of cylinders 204 through respective intake valves 228 and combined with fuel (e.g., gasoline) from a primary fuel injector or other fuel supply system (not shown). The fuel/air mixture is compressed within respective primary combustion chambers 232 within the cylinders 204 by respective pistons 208 that are coupled to the crankshaft 212. The compressed fuel/air mixture is ignited by the spray of hot gasses from the TJI system 120, which was previously shown in greater detail in FIG. 1 and described in greater detail above (with the exception of the second spark plug 15).

The combustion of the compressed fuel/air mixture drives the respective pistons downward 208, thereby turning the crankshaft 212 and generating drive torque. Exhaust gas resulting from combustion is expelled from the cylinders 204 via respective exhaust valves 236 and into an exhaust manifold 244 of an exhaust system 240, where it could then be utilized for various potential benefits. An optional turbocharger 248, for example, could utilize the kinetic energy of the exhaust gas to cause forced induction into the engine 116 (the induction system 216) for increased power generation. A controller 132 is configured to control operation of the electrified powertrain 108. More specifically, the controller 132 controls the electrified powertrain 108 (the engine 116 and the electric motor(s) 124) to satisfy a driver torque request (e.g., based on input from a driver interface 136, such as an accelerator pedal). The controller 132 also controls the electrified powertrain 108 to satisfy emissions goals. This includes, for example, controlling the electrified powertrain 108 to mitigate or eliminate emissions during cold starts of the engine 116.

A cold start of the engine 116 refers to when the engine 116 has been off for a period and the primary combustion chamber 232 and catalysts/treatment components in the exhaust system 240 have not yet warmed up to a sufficient temperature (e.g., as indicated by measurements from sensor(s) 140) to efficiently mitigate or eliminate emissions generated by the engine 116. As mentioned above with reference to FIG. 1, one solution to the limitations of TJI technology the addition of a secondary spark plug 15, but this increases costs and packaging and limits the applicability of TJI to only specifically-designed engines.

The controller 132 of the present application is therefore configured to, in response to a detected cold start request, control the electric motor(s) 124 to generate drive torque to physically power the engine 116 (via the crankshaft 212) for a period to increase a temperature within the particular primary combustion chamber 232 (and the respective secondary pre-chamber and nozzle housing). After the period, the controller 132 is configured to start the engine 116 by combusting a primary charge of fuel/air within the respective primary combustion chamber 232 using the TJI system 120.

As previously mentioned, another problem or limitation with TJI technology is its inability to ignite the main charge at certain operating conditions, such as light load operation. Conventional TJI-equipped engines have to take this into account and have additional systems for providing torque or otherwise enhancing engine torque output during these light load conditions. According to another aspect of the present application, the controller 132 is further configured to detect a light load request and, in response to detecting the light load request, temporarily disabling or shutting off the engine 116 and controlling the electric motor(s) 124 to generate drive torque satisfying the light load request. In other words, this drawback of TJI technology is completely avoidable by using the electric motor(S) 124 for temporary torque generation during light load operation (e.g., via the use of the battery system and the electronic drive module (EDM) comprising the electric motor(s) 124).

In yet another aspect of the present application, the engine 116 is further configured to recycle or re-use heat energy generated during the temporary motoring of the engine 116 using the electric motor(s) 124. This could be, for example, (i) using the turbocharger 248 as described above, (ii) commanding/controlling, using a valve control (VC) system 122, a closing overlap of the intake/exhaust valves 228, 236 to recycle exhaust gas resulting from combustion of the primary fuel/air charge within the particular cylinder 204 (also known as "scavenging"), and/or (iii) using a high pressure exhaust gas recirculation (EGR) system 252 (e.g., a recirculation path and a respective valve) to recirculate the exhaust gas back into the engine 116. After the engine 116 is started/restarted, conventional strategies for waste heat energy recovery are utilized. The controller 132 and the various systems/devices described above may also referred to as a "cold start aid" system 104 of the electrified vehicle 100.

Figure 3:
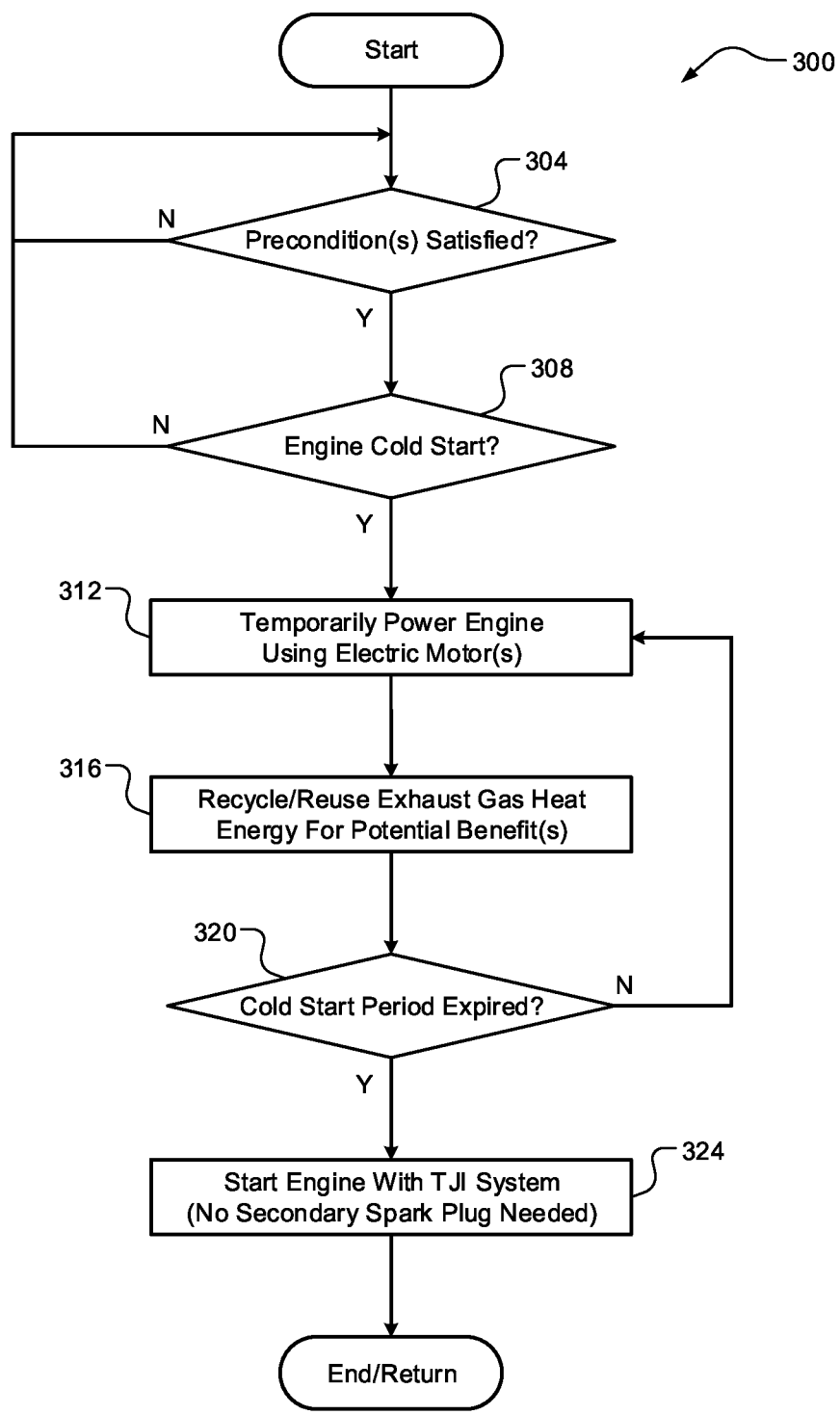
FIG. 3 is a flow diagram of an example method of controlling an electrified powertrain of an electrified vehicle according to the principles of the present application.

Referring now to FIG. 3, a flow diagram of an example method 300 of controlling an electrified powertrain of an electrified vehicle according to the principles of the present application is illustrated. While components of the electrified powertrain 108 are specifically referenced for descriptive/illustrative purposes, it will be appreciated that this method 300 could be applicable to any suitable series electrified powertrain having a TJI-equipped engine. At 304, the controller 132 determines whether a set of precondition(s) are satisfied. This could include, for example, the electrified powertrain 108 being free of any malfunctions/faults that would preclude or otherwise limit operation. When true, the method 300 proceeds to 308. Otherwise, the method 300 ends or returns to 304 for one or more additional cycles.

At 308, the controller 132 detects whether an engine cold start has been requested. When true, the method 300 proceeds to 312. Otherwise, the method 300 ends or returns to 304 or 308. At 312, the controller 132 temporarily powers the engine 116 for a period using the electric motor(s) 124. At optional 316, the controller 132 recycles/reuses the exhaust gas kinetic/heat energy via one or more of the previously described techniques/systems (e.g., turbocharger, scavenging, and/or EGR). At 320, the controller 132 determines whether this temporary cold start period has expired. This could be, for example, based on sensed temperature(s) or a preset timer. When true, the method 300 proceeds to 324. Otherwise, the method 300 ends or returns to 312. At 324, the controller 132 cold starts the engine 116 using the TJI system 120 and without the need for the secondary spark plug 15. The method 300 then ends or returns to 300 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electrified powertrain of an electrified vehicle, the electrified powertrain comprising:
   an internal combustion engine:
      configured to combust fuel/air within respective primary combustion chambers of a plurality of cylinders to generate drive torque, and
      including a turbulent jet ignition (TJI) system configured to combust a pre-charge of fuel/air in a pre-chamber of a particular cylinder using a respective first spark plug and expel heat energy therefrom into a respective primary combustion chamber of the particular cylinder;
   one or more electric motors connected in series with the engine and configured to generate drive torque; and
   a controller configured to detect a request to cold start the engine and, in response to the detected cold start request:
      control the one or more electric motors to generate drive torque to physically power the engine for a period to increase a temperature within the particular primary combustion chamber; and
      after the period, starting the engine by combusting a primary charge of fuel/air within the respective primary combustion chamber using the TJI system,
   wherein controlling the one or more electric motors to physically power the engine for the period eliminates a need for a respective second park plug of the TJI system that is associated with the particular cylinder and configured to heat and promote combustion within the particular primary combustion chamber.

2. The electrified powertrain of claim 1, wherein the controller is further configured to:
    detect a light load request; and
    in response to detecting the light load request, temporarily disabling or shutting off the engine and controlling the one or more electric motors to generate drive torque satisfying the light load request.

3. The electrified powertrain of claim 1, wherein the elimination of the respective second spark plug decreases at least one of cost and packaging of the engine.

4. The electrified powertrain of claim 1, wherein the engine is further configured to recycle or re-use heat energy generated by controlling the one or more electric motors to generate drive torque to physically power the engine for the period.

5. The electrified powertrain of claim 4, wherein the engine further comprises an exhaust gas recirculation (EGR) system configured to recycle exhaust gas resulting from combustion of the primary fuel/air charge back into the engine.

6. The electrified powertrain of claim 1, wherein the engine further comprises a valve control system configured to control an overlap of closing intake and exhaust valves of the particular cylinder to recycle exhaust gas resulting from combustion of the primary fuel/air charge within the particular cylinder.

7. The electrified powertrain of claim 1, wherein the TJI system is capable of being incorporated to any engine without a re-design.

8. A method of controlling an electrified powertrain of an electrified vehicle, the electrified powertrain comprising an internal combustion engine comprising a turbulent jet ignition (TJI) system and being connected in series with one or more electric motors, the method comprising:
    detecting, by a controller of the electrified powertrain, a request to cold start the engine; and
    in response to the detected cold start request:
        controlling, by the controller, the one or more electric motors to generate drive torque to physically power the engine for a period to increase a temperature within a primary combustion chamber of a cylinder of the engine, and
        after the period, starting, by the controller, the engine by combusting a primary charge of fuel/air within the primary combustion chamber using the TJI system to combust a pre-charge of fuel/air in a respective pre-chamber of the cylinder using a respective first spark plug and expelling heat energy therefrom into the primary combustion chamber of the cylinder,
    wherein controlling the one or more electric motors to physically power the engine for the period eliminates a need for a respective second park plug of the TJI system that is associated with the cylinder and configured to heat and promote combustion within the primary combustion chamber.

9. The method of claim 8, wherein the elimination of the respective second spark plug decreases at least one of cost and packaging of the engine.

10. The method of claim 8, further comprising:
    detecting, by the controller, a light load request; and
    in response to detecting the light load request, temporarily disabling or shutting off, by the controller, the engine and controlling the one or more electric motors to generate drive torque satisfying the light load request.

11. The method of claim 8, wherein the engine is further configured to recycle or re-use heat energy generated by controlling the one or more electric motors to generate drive torque to physically power the engine for the period.

12. The method of claim 11, wherein the engine further comprises an exhaust gas recirculation (EGR) system configured to recycle exhaust gas resulting from combustion of the primary fuel/air charge back into the engine.

13. The method of claim 8, wherein the engine further comprises a valve control system configured to control an overlap of closing intake and exhaust valves of the particular cylinder to recycle exhaust gas resulting from combustion of the primary fuel/air charge within the particular cylinder.

14. The method of claim 8, wherein the TJI system is capable of being incorporated to any engine without a re-design.

* * * * *